US007593388B1

(12) United States Patent
Mitchell et al.

(10) Patent No.: US 7,593,388 B1
(45) Date of Patent: Sep. 22, 2009

(54) CONVERTOR SHARED BY MULTIPLE VIRTUAL PRIVATE NETWORKS

(75) Inventors: Julian Mitchell, Maidenhead (GB); Dany Sylvain, Gatineau (CA); Scott Larrigan, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 983 days.

(21) Appl. No.: 10/675,162

(22) Filed: Sep. 30, 2003

(51) Int. Cl.
*H04L 12/66* (2006.01)

(52) U.S. Cl. .................. 370/352; 370/357; 370/389

(58) Field of Classification Search .............. 370/466, 370/467, 401, 402, 395, 352, 395.5, 389 370/383; 726/12
See application file for complete search history.

(56) References Cited

U.S. PATENT DOCUMENTS

| | | | | |
|---|---|---|---|---|
| 6,226,751 B1 * | 5/2001 | Arrow et al. ............... 726/15 |
| 6,741,585 B1 * | 5/2004 | Munoz et al. .............. 370/352 |
| 6,879,680 B2 * | 4/2005 | Donovan et al. ......... 379/220.1 |
| 7,085,270 B2 * | 8/2006 | Inouchi et al. ............. 370/392 |
| 7,107,614 B1 * | 9/2006 | Boden et al. ............... 726/15 |
| 7,155,518 B2 * | 12/2006 | Forslow .................... 709/227 |
| 7,304,986 B2 * | 12/2007 | Allen et al. ................ 370/356 |
| 7,330,463 B1 * | 2/2008 | Bradd et al. ............... 370/352 |
| 7,385,995 B2 * | 6/2008 | Stiscia et al. .............. 370/412 |
| 2001/0012775 A1 * | 8/2001 | Modzelesky et al. ........ 455/427 |
| 2002/0057786 A1 * | 5/2002 | Donovan et al. ........ 379/220.01 |
| 2003/0093536 A1 * | 5/2003 | 't Hooft .................... 709/227 |
| 2003/0118002 A1 * | 6/2003 | Bradd et al. ............... 370/352 |
| 2003/0147402 A1 * | 8/2003 | Brahim ................. 370/395.53 |
| 2003/0177221 A1 * | 9/2003 | Ould-Brahim et al. ...... 709/223 |
| 2004/0105459 A1 * | 6/2004 | Mannam .................... 370/465 |
| 2004/0136534 A1 * | 7/2004 | Stiscia et al. .............. 380/256 |
| 2004/0136712 A1 * | 7/2004 | Stiscia et al. ............... 398/60 |
| 2005/0047713 A1 * | 3/2005 | Antosik ..................... 385/24 |
| 2005/0068942 A1 * | 3/2005 | Chu et al. .................. 370/352 |
| 2005/0105708 A1 * | 5/2005 | Kouchri et al. ............. 379/219 |
| 2005/0111469 A1 * | 5/2005 | Howell ..................... 370/410 |
| 2005/0141504 A1 * | 6/2005 | Rembert et al. ............ 370/392 |
| 2005/0220014 A1 * | 10/2005 | DelRegno et al. .......... 370/230 |
| 2005/0220143 A1 * | 10/2005 | DelRegno et al. .......... 370/471 |

(Continued)

FOREIGN PATENT DOCUMENTS

EP      1768343 A2 *  3/2007

OTHER PUBLICATIONS

MPLS and next generation access networks; Kankkunen, A.; Universal Multiservice Networks, 2000. ECUMN 2000. 1st European Conference on Oct. 2-4, 2000 pp. 5-16.*

(Continued)

*Primary Examiner*—Edan Orgad
*Assistant Examiner*—Salman Ahmed
(74) *Attorney, Agent, or Firm*—Barnes & Thornburg LLP

(57) ABSTRACT

A VPN converter for interfacing two or more VPNs to an external network receives information relating to a communication session between an entity in any of the VPNs and the external network and converts a format such as an encoding or transmission format of the information, e.g. between VoIP packets and TDM signals for the PSTN. The converter is under the control of a call server and carries out routing and NAT functions. It determines which VPN the information relates to. By sharing the call server and converter between many VPNs, the amount of equipment can be reduced.

40 Claims, 7 Drawing Sheets

U.S. PATENT DOCUMENTS

2005/0220148 A1* 10/2005 DelRegno et al. ............ 370/498
2005/0226210 A1* 10/2005 Martin ........................ 370/351
2006/0013209 A1*  1/2006 Somasundaram ............ 370/389
2006/0239242 A1* 10/2006 Huffschmid ................. 370/352
2007/0064594 A1*  3/2007 Norton ........................ 370/218
2007/0140250 A1*  6/2007 McAllister et al. ........... 370/392
2008/0285438 A1* 11/2008 Marathe et al. .............. 370/220

OTHER PUBLICATIONS

Hybrid transport solutions for TDM/data networking services; Hernandez-Valencia, E.; Communications Magazine, IEEE vol. 40, Issue 5, May 2002 pp. 104-112.*

* cited by examiner

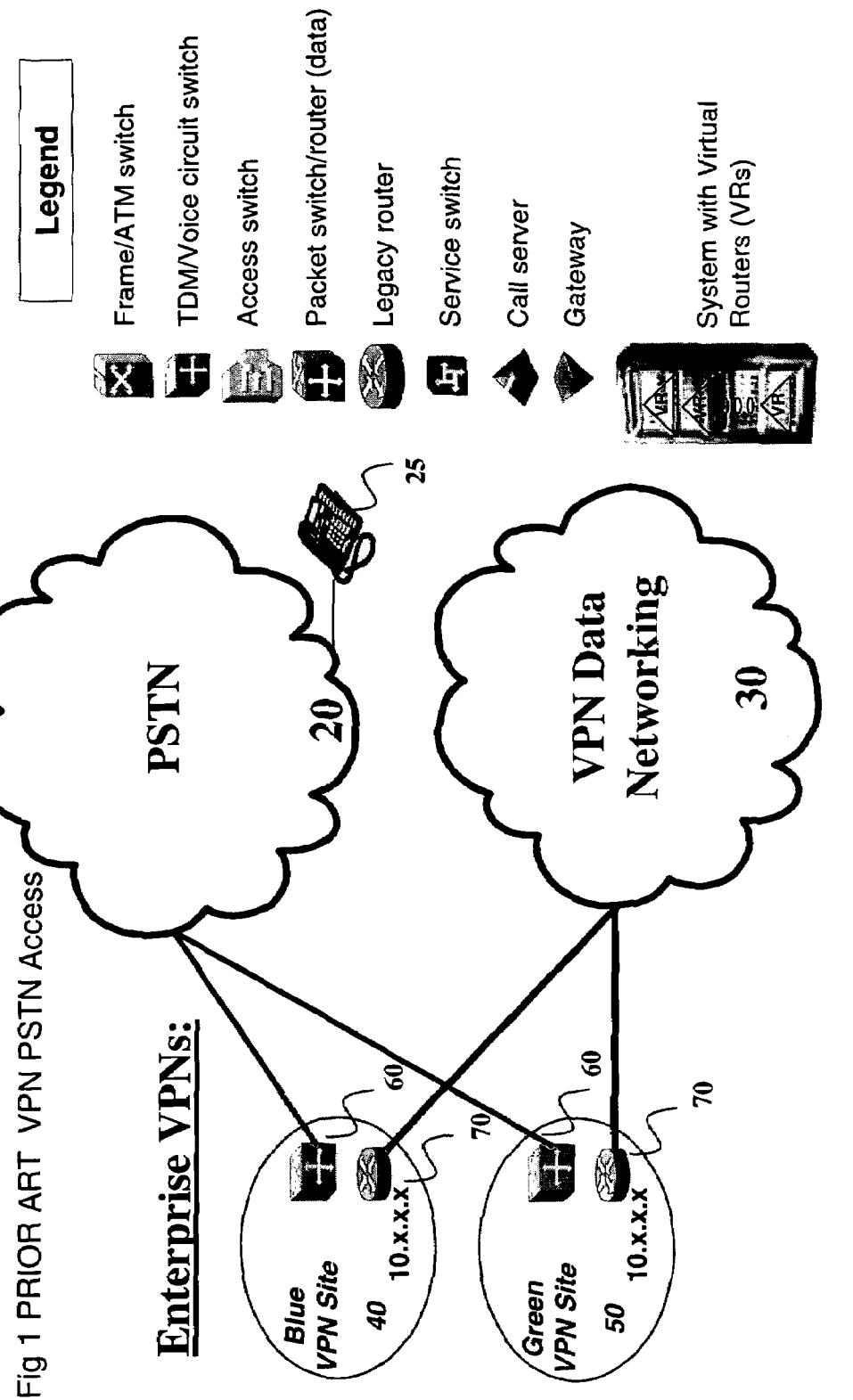

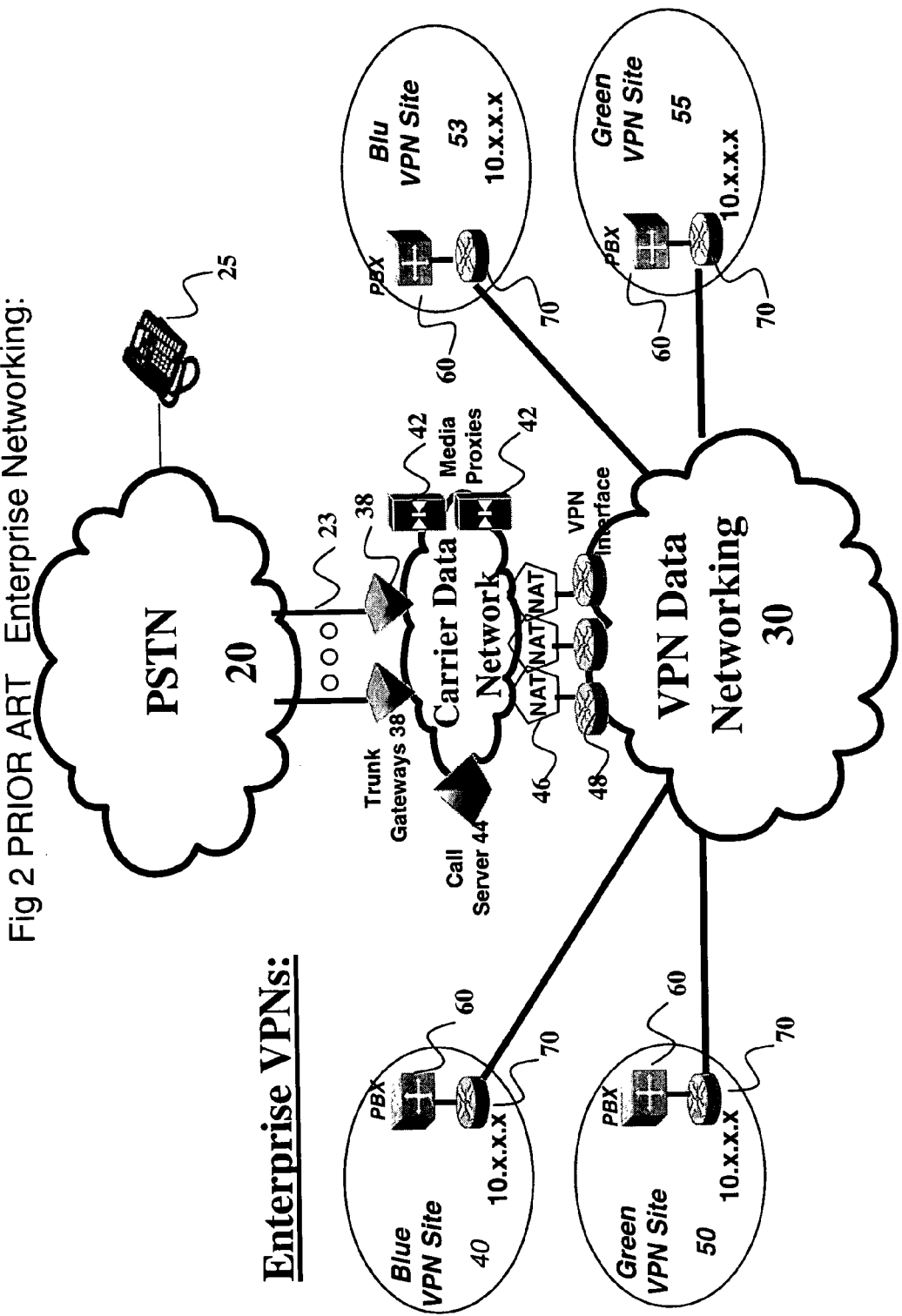
Fig 2 PRIOR ART Enterprise Networking:

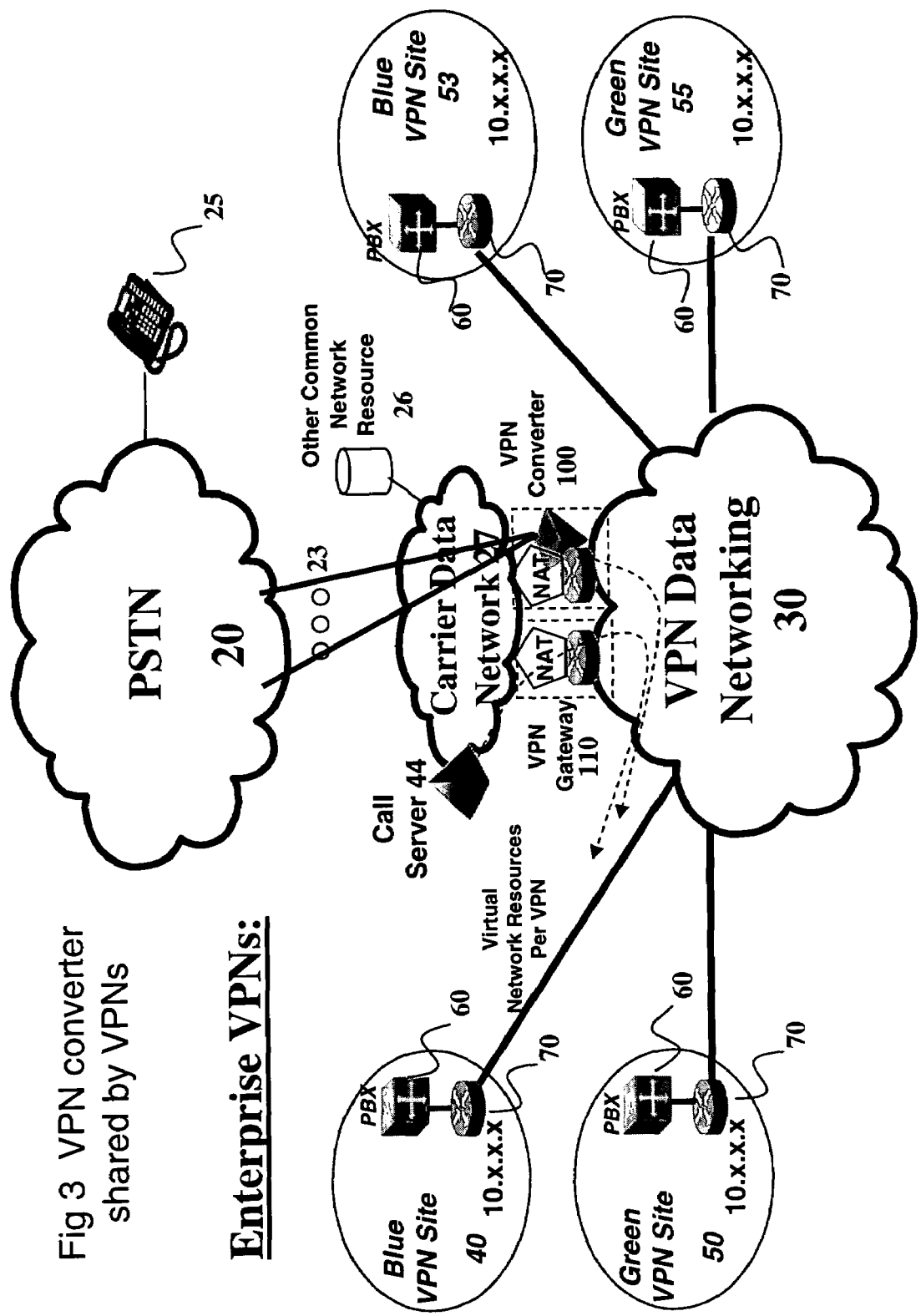
Fig 3 VPN converter shared by VPNs

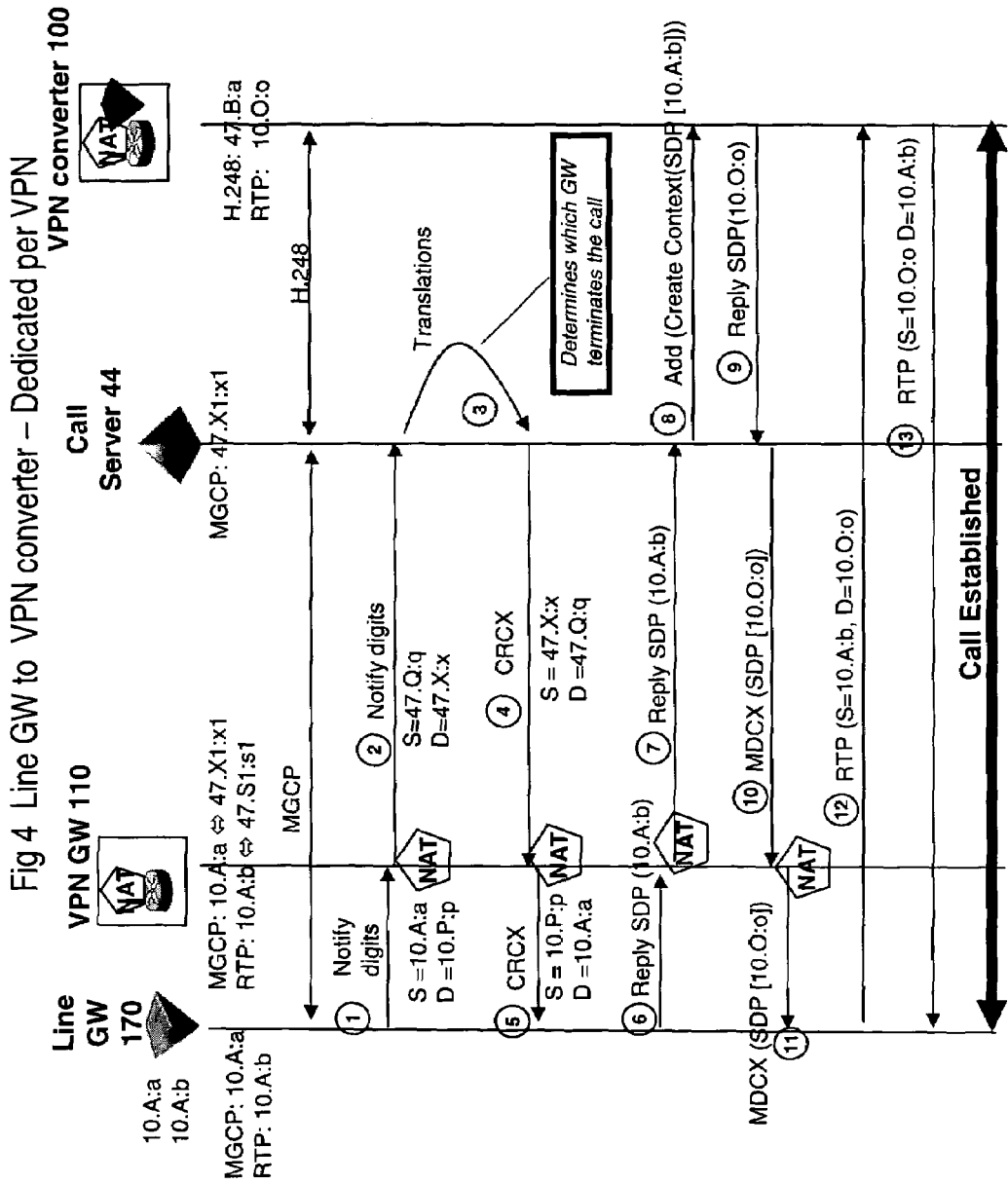

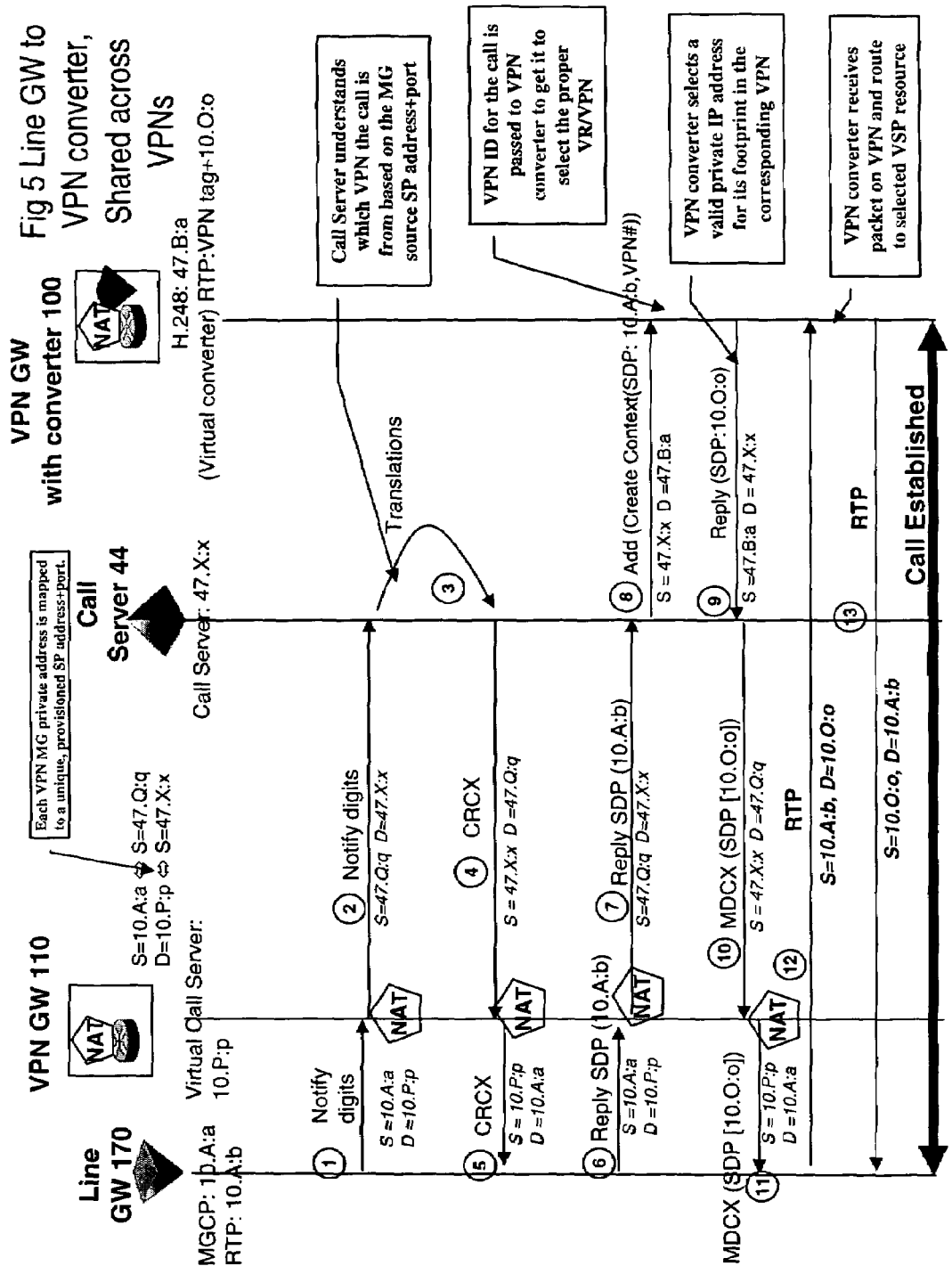

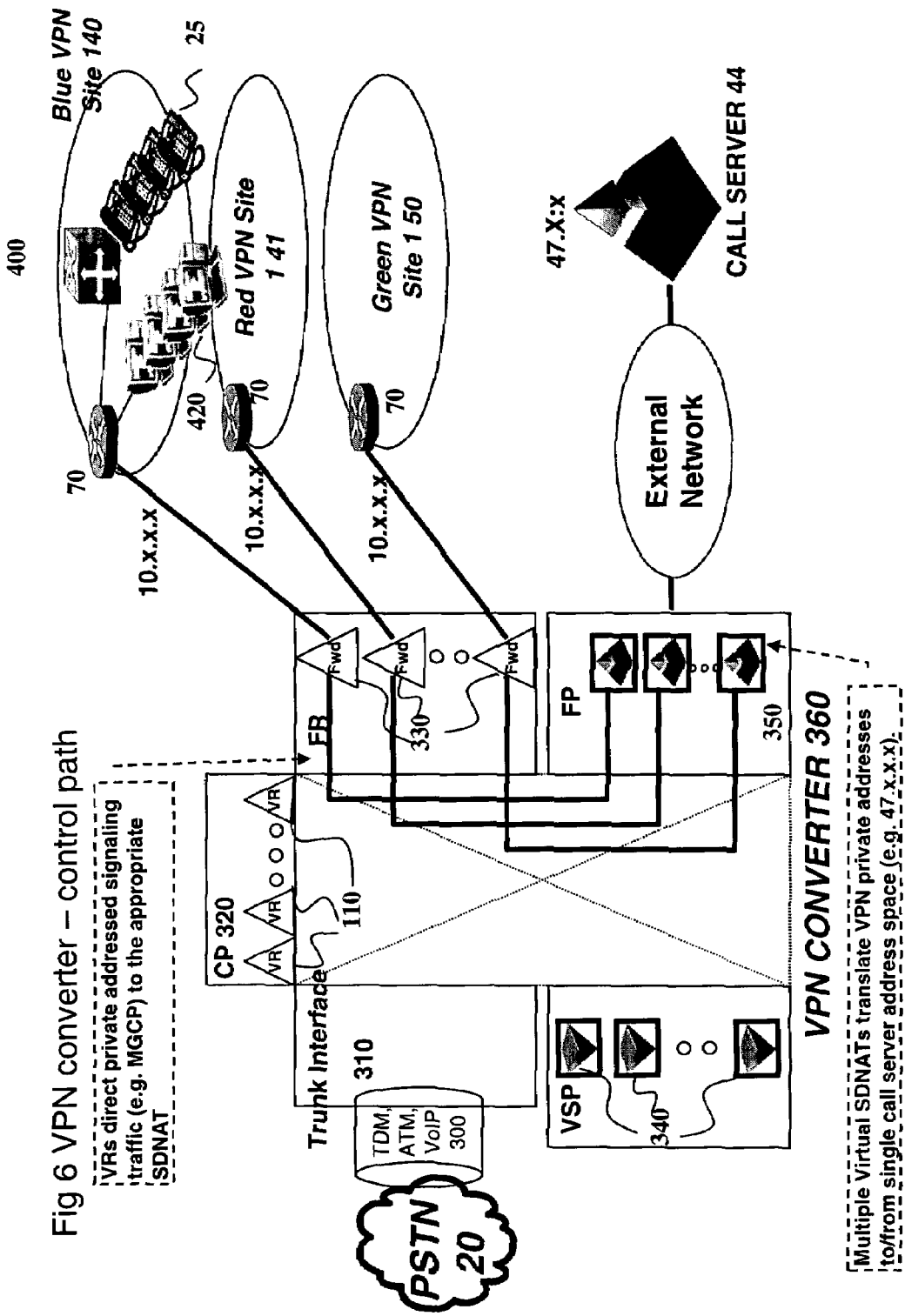

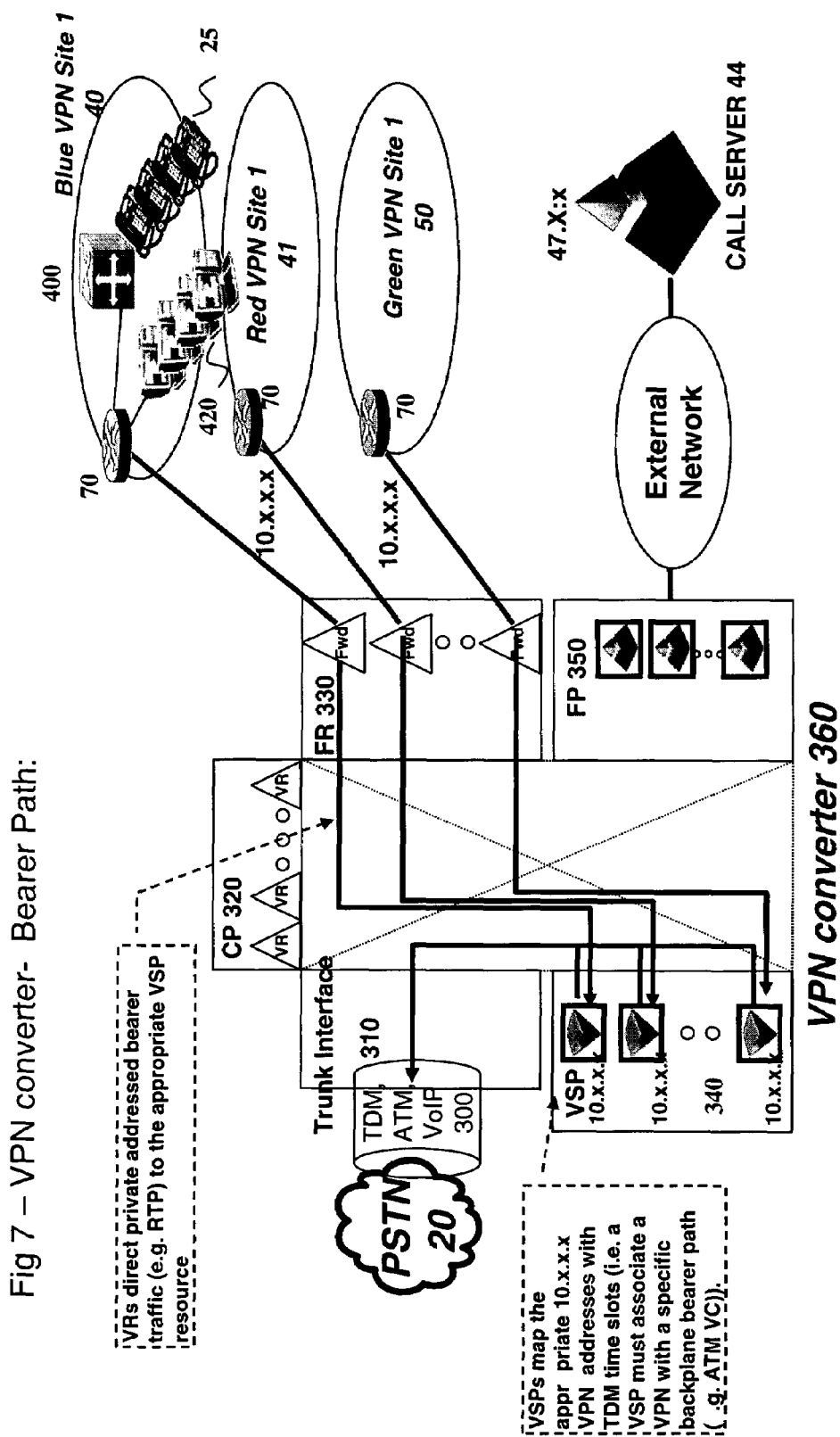
Fig 7 – VPN converter- Bearer Path:

CONVERTOR SHARED BY MULTIPLE VIRTUAL PRIVATE NETWORKS

RELATED APPLICATIONS

This invention relates to copending U.S. patent application Ser. Nos. 10/675,063 and 10/675,645 respectively entitled "Gateway shared by multiple virtual private networks" and "Media proxy having interface to multiple virtual private networks" of even filing date, and hereby incorporated by reference.

FIELD OF THE INVENTION

This invention relates to VPN gateways for interfacing two or more VPNs (Virtual private networks or virtual packet networks), to methods and software for such apparatus, and to methods of offering a VPN service over such apparatus.

BACKGROUND TO THE INVENTION

A broad definition of a VPN is 'any network built upon a public network and partitioned for use by individual customers'. This results in public frame relay, X.25, and ATM networks being considered as VPNs. These types of VPNs are generically referred to as Layer 2 VPNs. Another form of VPNs are networks constructed across shared IP backbones, referred to as 'IP VPNs' or Internet VPNs. IP VPNs are provided typically using well engineered and protected IP networks. One popular type of VPN is described in RFC 2547 as published by the Internet Engineering Task Force. On the other hand, Internet VPN uses the open, distributed infrastructure of the Internet to transmit data between corporate sites. Companies using an Internet VPN set up connections to the local connection points (called points-of-presence [POPs]) of their Internet service provider (ISP) and let the ISP ensure that the data is transmitted to the appropriate destinations via the Internet, leaving the rest of the connectivity details to the ISP's network and the Internet infrastructure. Because the Internet is a public network with open transmission of most data, Internet-based VPNs may include measures for encrypting data passed between VPN sites, which protects the data against eavesdropping and tampering by unauthorized parties. Business uses of VPNs include Remote Access, Site-to-Site links and Extranets References to VPNs are intended to encompass networks with their own private or non private addressing plan, using shared resources such as call servers or gateways.

If such VPNs are offered as a service by a service provider such as telecoms carrier organizations, they will typically be arranged to have security gateways. Security gateways sit between public and private networks, preventing unauthorized intrusions into the private network. They may also provide tunneling capabilities and encrypt private data before it is transmitted on the public network. In general, a security gateway for a VPN can be implemented as part of a router, or of a firewall, or of integrated VPN hardware, or of VPN software. A security gateway also frequently includes network address translators (NAT). The NAT provides two key functions. First, it allows the enterprise to use a private IP addressing numbering plan (such as 10.x.x.x), frequently needed due to the scarceness of IP addresses with IPv4. Secondly, NAT adds another layer of security as it effectively hides the address of devices in the enterprise and blocks any unsolicited attempt to connect with them from the public network. Unfortunately, NAT has the side effect of modifying the IP address and port address of devices in the private network when they communicate with the public network. As is well known, a number of protocols running above the IP layers, such as call processing (e.g. ITU H.248, ITU H.323, IETF MGCP (Media Gateway Control Protocol) (RFC 3435)) and voice transport protocols (e.g. IETF RTP (RFC 1889)) are disrupted by this address translation. A number of techniques have been implemented to get around the NAT problem but all have some form of drawbacks, in term of equipment cost or configuration complexities. The IETF Midcom (Middlebox Communication) working group has proposed two pre-midcom solutions: First, Media Proxies can be inserted into the call, which will be described below, with reference to FIG. 2. However they are costly additional hardware, and may not be on the natural path of the media resulting in media triangulation problems and added delay. Alternatively, the STUN protocol can be used by the gateway, but this results in all calls being public and negates the other advantages of using the VPNs for such traffic. STUN is the Simplified Traversal for UDP NAT as defined by the IETF—RFC 3489 on STUN—Simple Traversal of User Datagram Protocol (UDP) Through Network Address Translators (NATs). This invention addresses such problems and the additional complexities of network configuration and equipment that they can cause.

FIG. 1 shows how enterprises typically use VPNs today. Enterprises have multiple sites that need to be interconnected for data traffic. By subscribing to a VPN service from a public carrier, they do not need to setup dedicated point to point transmission circuits such as DS1 or E1 between each sites. Instead, they interconnect at the edge of the public carrier's network using one transmission circuit and from there, the carrier's VPN equipment routes the traffic to the proper end point (other sites for the same enterprise) which are similarly attached to the carrier's VPN network. In this example, all voice traffic, either going to the PSTN (public service telephone network) or going to other enterprise sites is handled separately. In FIG. 1, a VPN data networking environment 30 is provided by a service provider for a number of enterprises. Two examples are shown, a "blue" VPN site 40, and a "green" VPN site 50. The green enterprise uses the private 10.x.x.x address range and similarly, the green VPN uses the overlapping private 10.x.x.x address range. In practice, each VPN would have multiple sites, only one is shown for each VPN. Each site has a router 70 for routing IP packet to the VPN data networking environment, which can be the public internet or private networks. Each site has a PBX 60, coupled to the PSTN 20, to reach a generic destination phone 25.

It is known to use a VPN not only for data traffic but also for voice traffic. The advantage of this is that it can reduce the expense and equipment otherwise needed for handling those types of traffic separately. An example is shown in FIG. 2. FIG. 2 shows a known example in which voice traffic is carried over the VPN to reach the PSTN 20. Corresponding reference numerals to those of FIG. 1 have been used where appropriate. The TDM/voice circuit switch 60, typically in the form of a (private branch exchange) is now coupled to the VPN router 70 at each of the VPN sites. Inter-site voice traffic can stay within the enterprise VPN but a means to access the PSTN is needed. This is implemented by means of trunk gateways 38 for coupling PSTN trunks 23 to a carrier data network 27. The carrier data network is coupled to each of the VPNs in the data networking environment by one or multiple NATs 46 (network address translator) and VPN interface routers 48. The carrier data network 27 includes one or multiple call servers 44 for controlling the call and handling signaling packets. The carrier data network 27 also includes media proxies 42 to get around the NAT problem described earlier. The operation of such an arrangement will now be summarized.

Calls originate from the enterprise users connected to a telephony switch, typically a local PBX, and then go through a conversion to VoIP (Voice over IP) form, either via a media gateway inside the PBX itself or via an external media gateway. Instead of being routed over the public service telephone network (PSTN), the VoIP traffic is merged with the data traffic at the local VPN router 70. If the call is to another enterprise site connected in similar fashion to the VPN, then the VoIP traffic simply flows from site to site along with the data traffic. However, if the call is to be between a VPN site and a user on the PSTN, then the VoIP traffic needs to exit the VPN confines. This is typically done by interworking the enterprise VPN with the carrier data network where the equipment needed to interface to the PSTN reside. The interworking can be done a number of ways and may involve multiple interconnection points depending on the size of the network, but would in most cases involve going through a NAT. The NAT is needed to allow the devices in the enterprise using the enterprise IP addresses (frequently using the reserved IP private address range 10.x.x.x) to establish communication with the devices in the carrier data network using its own IP addressing scheme, using either public or private IP addressing. The PBX 60 and associated media gateway communicate with the call server 44 to establish calls to the PSTN. The call server 44 selects one trunk gateway 38 to complete the call to the PSTN. Because of the NAT, the call server cannot simply provide the enterprise media gateway and the trunk gateway with each others respective IP addresses and let the gateways send VoIP packets to each other as would normally be the case. The IP addresses for each gateway are corrupted by the NAT operation. To get around this problem, the call server 44 can put in the call path specialized media proxies 42 whose operation allows both gateways to communicate with each other. The call server 42 instructs the enterprise media gateway and the trunk gateway to send their packets to the media proxy 42. Essentially the media proxy 42 patches together the VoIP flow coming from the enterprise media gateway and the trunk gateway, as instructed by the call server 44 by learning the translated IP addresses from VoIP packets sent to it. Multiple enterprise VPNs can be interconnected to the carrier data network in similar fashion and share the infrastructure needed to access the PSTN.

These complex addressing arrangements allow the central call server of the service provider to provide services for VoIP end points connected into a number of VPNs. They add considerable complexity and cost in terms of capital expenditure and running costs. Such costs escalate rapidly as the number of VPNs increases.

SUMMARY OF INVENTION

It is an object of the present invention to provide improved apparatus and methods. According to a first aspect of the present invention, there is provided:

a VPN converter having interfaces for interfacing two or more VPNs to an external network or networks, arranged to receive information relating to a communication session between an entity in any of the VPNs and the external network or networks and to convert a format of the information.

An advantage of such a converter is reduced network costs when the number of VPNs increases, as the quantity of network equipment needed to interface each VPN and the quantity of individual converters would otherwise become prohibitive. In some cases there is no longer a need to go through a media proxy. Hence the capital costs and maintenance costs of additional equipment can be reduced or avoided. For software implementations there can be a reduction in the number of software modules and thus lower memory requirements and reduced complexity. The integration of a VPN interface with the converter allows the converter to use native VPN addresses.

An additional feature for a dependent claim is the converter being arranged to cooperate with a call server in the external network to effect the communication session.

This combination is notable for efficiencies which can arise from sharing of the server for centralized control, as well as sharing of the converter by multiple VPNs.

Another additional feature is the communication session being one of: a data session, a telephony call, a video call, and a fax communication.

These are notable for being the more common and commercially significant types of communication sessions.

Another additional feature is the converter being arranged to convert a transmission format of the information.

Enabling interfacing of existing networks having different transmission formats can be significant to achieve more widespread use.

Another additional feature is the transmission format being one of IP, ATM, MPLS and TDM formats.

These are notable for being the more common and commercially significant types of transport formats.

Another additional feature is the converter being arranged to convert an encoding format of the information.

Enabling interfacing of existing networks having different encoding formats can be significant to achieve more widespread use.

Another additional feature is the encoding format being one of G.711, G.729, and G.726 formats.

These are notable for being the more common and commercially significant types of encoding formats.

Another additional feature is the converter being arranged to convert between different versions of the IP protocol.

As interfacing networks with different versions is likely to become a common scenario in practice, it is commercially significant to be able to handle it, and it helps enable progressive upgrading of networks or parts of networks.

Another additional feature is the converter being arranged to interface communication sessions in the form of calls having one end in one of the VPNs and another end in the external network.

As such calls are likely to be a significant part of the information flows, it becomes important to be able to handle them efficiently and limit the number of entities or boxes or equipment racks needed.

Another additional feature is the converter being arranged to return to the entity a destination address which lies in a selected address space of the respective VPN for bearer packets of the call being set up in response to a control indication for this call from the call server.

This is notable for enabling the call server to control the converter to route the bearer packets while making the destination appear to be within the VPN. A consequence can be simplification of the addressing and firewall configuration for the VPN if the specific entities in the external network can appear as trusted resources inside the VPN.

Another additional feature is the converter being arranged to associate signals related to the communication session being set up in the external network, and the destination address for the communication session being set up.

This is notable for enabling efficient handling of information flows in two directions relating to the same call.

Another additional feature is the signals relating to a TDM slot of a trunk, and an IP address allocated to the communication session.

TDM is widely used for existing voice call traffic so is commercially significant.

Another additional feature is the converter being arranged to determine which of the VPNs the information relates to, and to pass an identity of that VPN to an entity of the external network.

An advantage is that the entity such as a call server can be simpler if it does not need to deduce the identity of the VPN.

Another additional feature is the determination of the VPN identity being based on an external network address of the VPN entity.

This has the advantage of simplicity of implementation, but may need careful assignment of external network addresses to ensure there is no ambiguity.

Another additional feature is the determination of the VPN identity being based on a VPN identifier parameter provided by an entity of the VPN.

This can be more flexible and need not rely on assignment of external network addresses, but can be more complex to implement.

Another additional feature is the determination of the VPN identity being based on parameters associated with establishment of the communication session.

Another additional feature is the parameters comprising an E.164 address.

This is notable as it is a commonly used standard and can be used for representing a private dialing plan address.

Another additional feature is a number of interface ports each corresponding to a different one of the VPNs, and the determination of the VPN identity is based on which of the interface ports is used for the communication session.

This is a practical way of enabling differentiation of the VPNs without undue complexity.

Another aspect provides:

a server for controlling a communication session between an entity of any of multiple VPNs and an external network or networks via the converter of claim 1, the server being arranged to determine which of the VPNs is related to the communication session, and to cooperate with the converter to use the identity of the VPN in controlling how the communication session is handled by the converter.

This is notable for efficiencies which can arise from sharing of the server as well as sharing of the converter by multiple VPNs.

Another additional feature is the server being located in the external network, and the communication sessions comprising calls.

Another additional feature is the server being arranged to cooperate with the entity to determine the identity of the VPN.

Another additional feature is the server being arranged to determine the identity of the VPN based on an external network address of the VPN entity.

Another aspect of the invention provides a method of using a converter to interface two or more VPNs to an external network or networks, having the steps of receiving at the converter information relating to a communication session between an entity in any of the VPNs and the external network or networks and converting a format of the information.

An additional feature is the steps of passing a request for a communication session from the entity to a call server external to the VPN, determining which of the VPNs the entity belongs to, and using the identity of the VPN in the converter to route the information.

Another aspect provides a method of offering a virtual packet network service over the converter set out above.

The advantages of the apparatus can feed through to enable improvements to be made in the services using the apparatus, and the value of such services can increase. Such increased value over the life of the system, could prove far greater than the sales value of the equipment.

Another aspect provides a node for a network, the node having a converter as set out above.

Another aspect provides software for carrying out the methods set out above.

This acknowledges that software can be a valuable, separately tradable commodity. It is intended to encompass software, which runs on or controls "dumb" or standard hardware, to carry out the desired functions, (and therefore the software essentially defines the functions of the converter, and can therefore be termed a converter, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect of the invention provides a sequence of signals to and from a VPN converter having interfaces for interfacing two or more VPNs to an external network or networks, the external network or networks having a different data format to those of the VPNs, the VPN converter being arranged to convert the data format of information relating to a communication session between an entity in any of the VPNs and the external network or networks, the sequence comprising a signal from the entity of one of the VPNs, addressed to an entity in the external network which appears to have an address within an address range of the respective VPN, and a signal returned from the external network, converted by the VPN converter and routed by the VPN converter back towards the entity in the respective VPN.

As an additional feature, the sequence of signals further comprises a signal from the VPN converter to a call server containing an identity of the respective VPN.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 1 shows a known arrangement of VPNs with separate voice and data networks, FIG. 2 shows another known arrangement of VPNs with the PSTN coupled to the VPNs, FIG. 3 shows VPNs sharing a VPN converter according to a first embodiment of the invention, FIG. 4 shows another embodiment in the form of a sequence chart of call set up via the VPN converter using a call server and a VPN gateway, FIG. 5 shows another embodiment in the form of a sequence chart of call set up via the VPN converter using a call server and a VPN gateway using a VPN identifier, and FIGS. 6 and 7 show views an embodiment of a VPN converter showing control paths and bearer paths respectively.

DETAILED DESCRIPTION OF EMBODIMENTS

FIG. 3, Embodiment of VPN Converter

FIG. 3 shows a first embodiment of the invention. As in FIG. 2, voice traffic is handled by the VPN data networking environment. A simplified interface between this environment, having a number of VPNs, and the PSTN 20, is provided by the VPN converter 100. In this example, the external networks are exemplified by the carrier data network and the PSTN. The call server is an example of an entity in the address space of the carrier data network, and PSTN telephones are examples of entities in the address space of the PSTN. There is a VPN gateway 110 which provides an interface from the VPNs to the call server, and the VPN converter provides an interface to the PSTN. The VPN gateway and the VPN converter are shared by a number of VPNs. As shown diagrammatically, the VPN converter at the interface to the PSTN combines the functions of a router, a NAT, and a converter. The PSTN trunks are connected directly to this VPN converter without the need for passing via the media proxies as was the case in FIG. 2. The VPN gateway handles the signaling traffic passing between the call server 44 and the VPN data networking environment 30, by translating packet source and destination addresses, and by routing to or from the correct one of the VPNs. Hence the VPN gateway can ensure privacy and security of the call server, while the VPN converter handles the interface with the PSTN trunks, to convert packet data into TDM signals for such trunks. The gateway includes a number of virtual routers which feed packets to the NAT function of the gateway if they are signaling packets destined for the call server 44. Packets relating to the call once it is set up are routed via the converter for conversion to or from TDM trunk format for coupling to the PSTN 20. The virtual routers of the gateway and of the converter are effectively in the address space of one of the VPNs. Other virtual routers are provided in the address spaces of other VPNs. Hence each VPN appears to have a dedicated VPN converter and a dedicated gateway to the call server, though they are actually shared resources. Optionally the VPN gateway and the VPN converter can be integrated as one piece of equipment.

The VPN converter can also be arranged to route and convert signals to other common network resources 26 coupled to the carrier data network, not just the PSTN. Signaling and bearer packet flows for a VoIP call in the embodiment of FIG. 3 are shown by dotted lines. One dotted line shows a flow of signaling packets from the router 70 from the enterprise "blue" VPN site 40 through the VPN data network 30 to the shared gateway 110. From here they are sent by the virtual router of the gateway to the NAT component of the gateway and then over the carrier data network 27 (e.g. by standard IP routing) to the call server 44. More details of the sequence of signaling packets will be explained with reference to other figures below. Once the call has been set up using the signaling packets, the bearer packets carrying the voice information are transmitted as shown by the other dotted line in the figure. This extends from the router 70 of the "blue" VPN site 140 through the VPN data network 30 to the virtual router of the VPN gateway 100. This VPN gateway integrates a converter function, allowing the bearer packets to flow through the converter which converts the packets into TDM PSTN signals (and vice versa in the reverse direction).

FIG. 4 Sequence Chart of Call Set Up Without VPN Identifier

FIG. 4 shows a sequence chart for a VoIP call setup in the arrangement shown in FIG. 3. In this sequence chart, succeeding time instances are represented by the downward direction in the chart. The four columns represent events or steps at four different entities in the arrangement. The left-hand column shows the functions of a line gateway 170 at one VPN site which is coupled to a source of the call. The second column shows the functions of the shared VPN gateway 110, which includes a NAT function. The third column shows the functions of the call server 44. The fourth column shows the functions of the VPN converter 100.

The figure shows the IP addresses used in the headers of the packets sent between the entities. The letter S indicates the source address, and the letter D indicates the destination address. Letters A, Q, X and P represent variables. The letter after the colon indicates the UDP port. 10.x indicates a VPN address, and 47.x indicates a service provider address within the private network of the service provider. In this example, MGCP is used to communicate between the line gateway, and the call server 44. MGCP is a well known standard, other alternatives can be conceived. The H.248 standard is used between the call server and the VPN converter, again alternatives are conceivable. At step 1, the line gateway 170 initiates a VoIP call setup by notifying the dialed digits of the call to the call server. The call server has a real IP address of 47.X:x in the external address which is mapped by the VPN gateway SDNAT (source and destination NAT) function to an internal VPN address of 10.P:p. This address is routable within the VPN network to the VPN gateway. Therefore, the notification is routed by the VPN data network to the VPN gateway. At the VPN gateway a virtual router passes it to the SDNAT component of the VPN gateway. The SDNAT component carries out an SDNAT operation at step 2 and passes the packet with the modified address to the call server 44. At step 3, the call server undertakes translations and determines an end destination for the call, in terms of which converter the call should be sent to. At steps 4 and 5, an acknowledgement is returned by the call server toward the line gateway 170, in the form of a CRCX (create connection) message. The SDNAT component has stored a correspondence or mapping, and therefore is able to reconvert the packet addresses to enable the packet to reach the originating line gateway 170.

At step 6 the originating line gateway with SDP information (Session Description Protocol, IETF RFC 2327) to the call server 44 via the SDNAT component of the VPN gateway. At step 7, this is passed on by the VPN gateway. The SDP contains the VPN address selected by the originating line gateway to establish the voice communication. At step 8, the call server responds by sending a create context message to the destination, in this case the converter 100. In this example, the converter 100 is dedicated to the specific VPN containing the line gateway 170. In practice, multiple dedicated converters 100 can be configured using a common hardware platform that is shared and divided in multiple logical converters 100. The create context message includes the target VPN address of the originating line gateway that the destination should use to establish the voice communication. Step 9 shows the reply from the converter back to the call server. This reply includes the VPN address selected by the converter establish the voice communication. The integration of a VPN gateway with the converter allows the converter to use native VPN addresses.

Steps 10 and 11 show the call server sending an MDCX (modify connection) message to the originating the line gateway 170 via the VPN gateway, including the VPN address for the destination converter. In response, the originating line gateway can then start sending voice packets (step 12) in the form of an RTP (real time protocol, IETF RFC 3350) stream directly to the converter, using the VPN address it received in step 11. Similarly, the converter sends voice packets using RTP to the originating line gateway (step 13) using the VPN address it received in step 8. The VoIP call is now established and bearer packets can be sent from the line gateway 170 to the converter for conversion to the format of the external network and vice versa.

The translation of source and destination addresses can be of IP addresses or IP addresses with upper protocol port addresses (upper protocols: UDP, TCP, maybe others). Although shown with source and destination network address translation, this and other embodiments could be implemented with only conversion of VPN addresses of entities within the VPNs to addresses of the external network if desired, if hiding of VPN addresses were not needed.

In this example, the call server determines which converter to use for a given call or for a given VPN. The converter cannot be shared by different VPNs as the converter is always assumed to be part of a specific VPN. This configuration is simple but is not the most efficient. Converter resources that are not used in one VPN cannot be applied in another VPN which might benefit from it. One way to allow the converter resources to be shared across multiple VPN is shown in FIG. 5 described below.

FIG. 5 Sequence Chart of Call Set Up Using VPN Identity

FIG. 5 shows a similar VoIP call setup sequence chart to that of FIG. 4 and corresponding reference numerals have been used as appropriate. In this case, the converter is arranged to serve a number of VPNs, and be aware of which VPN each call relates to. At step 3, the call server understands which VPN the call is from based on the MG (media gateway) source SIP address and port. An alternate method is for the call server 44 to determine the VPN by analyzing the signaling information (digits) received as part of the call setup in step 2. Such signaling information may include a user group or business group ID that is unique. The signaling information can comprise an E.164 address, which is a commonly used standard and can be used for representing a private dialing plan address. At step 8 when the call server receives the reply SDP packet, it adds an identifier for the appropriate VPN (as determined in step 3) for sending to the converter. One benefit of identifying the VPN is so that a larger converter can be shared across multiple VPN, providing network simplification and efficiency. At step 9 the converter uses the knowledge of the identifier of the VPN to select the correct virtual router for that VPN among virtual routers provided in the converter (as shown in more detail in FIGS. 6 and 7). The converter assigns specific resources from the pooled resources for the duration of the call. The converter then selects a valid private IP address in the footprint of the corresponding VPN and sends that VPN address to the call server. That information is forwarded on in step 10, 11 to the line gateway. At step 12, line gateway can now start sending RTP packets toward the virtual router in the converter and hence to the external network (e.g. a trunk interface of the PSTN). Similarly the converter at step 13 can take the PSTN traffic and map it to an RTP stream and forward to the line gateway. Hence the call is established.

FIGS. 6, 7 Embodiment of VPN Converter Showing Components

FIGS. 6 and 7 show an embodiment of a VPN converter 360 in the form of a system incorporating various components including a PSTN interface function. The figure also shows surrounding entities including the VPNs, the PSTN and the call server which are coupled to the VPN converter. Illustrated are a blue VPN site 40, a red VPN site 41 and a green VPN site 50. Each site has a router 70, and a voice switch 400 coupled to telephones 25 and local computers 420. The system includes multiple virtual SDNATs (source/destination address translation) 350 to translate VPN private addresses to or from the address of the call server in an external network (e.g. 47.X:x). The system includes a CP (control processor) 320, which comprises the routing logic and routing control for the numerous virtual routers VR 110 which can be instantiated as desired to route information internally and to/from the various VPNs. Such virtual routers are one way of implementing sharing of the gateway between many VPNs. VRs direct private addressed signaling traffic (e.g. MGCP) to the appropriate SDNAT. One VR is assigned per VPN and it exchanges routing information with the routing entities within the VPN. This routing information is then used to control the configuration of the forwarding engines FWD 330. The forwarding engines FWD 330 are shown implemented on one or multiple separate cards FR (Functional Router) 332, though other arrangements can be conceived. The FRs also provide the physical or logical interface ports to each of the VPNs, using any of various physical interfaces such as SONET or Ethernet and various logical interfaces such as ATM, Frame Relay, IP, to suit the application. The FWD 330 forwards the data packets from the various VPNs to the FP (Functional Processing) card 350 providing the actual SDNAT function. The FP card is coupled to the external network and through that to the call server 44.

The system includes multiple voice signal processing (VSPs) cards 340 to handle the conversion from VoIP embedded into RTP packets to a different format (e.g. TDM) that is sent to the trunk interface card 310. In this example, the trunk interface card 310 is shown interconnected to the traditional TDM-based PSTN. Other trunk interface type could be based on ATM or IP. The VSP 340 has a number of converter resources 310 for converting packets from and to different formats. The FWD 330 forwards the bearer data packets from the various VPNs to the appropriate VSP 340 based on forwarding instruction received from the VR 110 logic in the CP 310.

Call setup begins with virtual routers directing private address signaling traffic shown by solid lines in FIG. 6, to the appropriate SDNAT instance on the FP for onward transmission over the service provider's network e.g. an IP network, to the call server 44.

Once a connection has been set up, as shown in FIG. 7, the bearer path shown by solid lines passes from the forwarding routers 330 for each of the VPNs to the VSP 340 and from there to the converter resources 310. The VSPs map the appropriate 10.x.x.x. VPN addresses to a particular TDM time slots (i.e. a VSP must associate a VPN with a specific backplane bearer path ATM VC for example). The system can be implemented in software using conventional languages running on conventional hardware, with each of the parts implemented on cards coupled by a backplane, following conventional practice.

There can be more than one of the VPN gateways coupled to each VPN, each of the VPN gateways being shared by two or more VPNs. Some or each of the systems 360 may have access to the Internet. External servers such as are represented by the common network resources 26 of FIG. 3 can have a variety of purposes. For example they can provide additional value added services to the calls such as video broadcast or streaming servers, voicemail servers or call center services, or announcement servers, a tone generators, or digit collectors for example. The servers can enable the service provider to provide VoIP centrex services. Other external servers can include a SIP (session initiation protocol) proxy, a web server, a storage server, a video server, a mail server, an H.323 gateway, a telephony client, and a telephony media gateway for example.

CONCLUDING REMARKS

As has been described above, a VPN converter for interfacing two or more VPNs to an external network receives information relating to a call between an entity in any of the VPNs and the external network and converts a format such as an encoding or transmission format of the information, e.g. between VoIP packets and TDM signals for the PSTN. The converter is under the control of a call server and carries out routing and NAT functions. It determines which VPN the information relates to. By sharing the call server and converter between many VPNs, the amount of equipment can be reduced and the arrangement can be simplified. In the case of software implementations there can be a reduction in the number of software modules and thus lower memory requirements and reduced complexity.

Although the examples show a communication session in the form of a VoIP call, clearly other types of communication session can be carried out. Other variations will be apparent to those skilled in the art, having corresponding advantages to those set out above, within the scope of the claims.

The invention claimed is:

1. A communication system comprising:
   a plurality of virtual private networks 'VPNs' interconnected by a first data network;
   a second data network connected to the plurality of VPNs via the first data network, the second data network using a network addressing scheme that is different to a network addressing scheme used by at least one of said plurality of VPNs;
   a VPN gateway interfacing the first data network and a call server in the second data network, the VPN gateway being configured to pass communication session signaling traffic between an entity in one of said plurality of VPNs and the call server for establishing a communication session between said entity in one of said plurality of VPNs and an entity in an external Time Division Multiplex 'TDM' network, said external TDM network handling communication session bearer traffic in a TDM format different to a packet data format of the first data network; and
   a VPN converter interfacing the first and second data networks and directly interfacing the first data network to said external TDM network, the VPN converter being configured to receive bearer traffic relating to said communication session established between said entity in one of said plurality of VPNs and the entity in the external TDM network and to convert said bearer traffic between the packet data format of the first data network and the TDM format used in the external TDM network.

2. The communication system of claim 1, wherein the plurality of VPNs is arranged to share the VPN converter as a common resource.

3. The communication system of claim 2, wherein the VPN converter comprises a plurality of virtual routers, said plurality of virtual routers being provided for said plurality of VPNs such that each of said plurality of virtual routers is provided with an address from an address space of its respective one of the plurality of VPNs.

4. The communication system of claim 1, wherein the communication session comprises one of a voice over Internet Protocol 'VoIP' call, a telephony call, a video call, and a fax communication.

5. The communication system of claim 1, wherein the VPN converter is arranged to convert an encoding format of the bearer traffic.

6. The communication system of claim 5, wherein the encoding format comprises one of G.711, G.729, and G.726 formats.

7. The communication system of claim 1, wherein the VPN converter is arranged to determine which of the plurality of the VPNs the communication session signaling information relates to, and to associate VPN converter resources to a communication session associated with the identified VPN.

8. The communication system of claim 7, wherein the VPN converter is arranged to determine the VPN identity based on an external network address associated with the VPN entity.

9. The communication system of claim 7, wherein the VPN converter is arranged to determine the VPN identity based on a VPN identifier parameter provided by an entity of the VPN.

10. The communication system of claim 7, wherein the VPN converter is arranged to determine the VPN identity based on parameters associated with establishment of the communication session.

11. The communication system of claim 10, wherein the parameters comprise an E.164 address.

12. The communication system of claim 1, wherein the external TDM network comprises a public switched telephone network 'PSTN'.

13. The communication system of claim 1, wherein, where more than one of the VPNs use private IP network addressing schemes, some of said private IP network addressing schemes have overlapping address ranges.

14. The communication system of claim 1, wherein the communication session signaling traffic comprises 'VoIP call signaling and the call comprises a VoIP call.

15. The communication system of claim 3, wherein the VPN converter comprises a network address translation 'NAT' function and the NAT function is configured to provide a network address translation function to each of the virtual routers.

16. A method of converting bearer traffic format in a communication system comprising: a plurality of virtual private networks 'VPNs' interconnected by a first data network; a second data network connected to the plurality of VPNs via the first data network, the second data network using a network addressing scheme that is different to a network addressing scheme used by at least one of said plurality of VPNs; a VPN gateway interfacing the first data network and a call server in the second data network; and a VPN converter interfacing the first and second data networks; the method comprising the steps of:
    directly interfacing the first data network to an external Time Division Multiplex 'TDM' network;
    configuring the VPN gateway to pass communication session signaling traffic between an entity in one of said plurality of VPNs and the call server for establishing a communication session between said entity in one of said plurality of VPNs and an entity in said external TDM network, said external TDM network handling communication session bearer traffic in a TDM format different to a packet data format of the first data network; and configuring the VPN converter to receive bearer traffic relating to said communication session established between said entity in one of said plurality of VPNs and the entity in the external TDM network and to convert said bearer traffic between the packet data format of the first data network and the TDM format used in the external TDM network.

17. The method of claim 16, wherein the plurality of VPNs share the VPN converter as a common resource.

18. The method of claim 17, wherein the VPN converter comprises a plurality of virtual routers, said plurality of virtual routers being provided for said plurality of VPNs such that each of said plurality of virtual routers is provided with an address from an address space of its respective one of the plurality of VPNs.

19. The method of claim 16, wherein the communication session is one of a voice over Internet Protocol 'VoIP' call, a telephony call, a video call, and a fax communication.

20. The method of claim 16, wherein the VPN converter converts an encoding format of the bearer traffic.

21. The method of claim 20, wherein the encoding format is one of G.711, G.729, and G.726 formats.

22. The method of claim 16, wherein the VPN converter determines which of the plurality of the VPNs the communication session signaling information relates to, and associates VPN converter resources to a communication session associated with the identified VPN.

23. The method of claim 22, wherein the VPN converter determines the VPN identity based on an external network address associated with the VPN entity.

24. The method of claim 22, wherein the VPN converter determines the VPN identity based on a VPN identifier parameter provided by an entity of the VPN.

25. The method of claim 22, wherein the VPN converter determines the VPN identity based on parameters associated with establishment of the communication session.

26. The method of claim 25, wherein the parameters comprise an E.164 address.

27. The method of claim 16, wherein the external TDM network is a public switched telephone network 'PSTN'.

28. The method of claim 16, wherein, where more than one of the VPNs use private IP network addressing schemes, some of said private IP network addressing schemes have overlapping address ranges.

29. The method of claim 16, wherein the communication session signaling traffic is 'VoIP call signaling and the call is a VoIP call.

30. The communication system of claim 18, wherein the VPN converter has a network address translation 'NAT' function and the NAT function provides a network address translation function to each of the virtual routers.

31. A virtual private network 'VPN' converter for a communication system comprising: a plurality of virtual private networks 'VPNs' interconnected by a first data network; a second data network connected to the plurality of VPNs via the first data network, the second data network using a network addressing scheme that is different to a network addressing scheme used by at least one of said plurality of VPNs; and a VPN gateway interfacing the first data network and a call server in the second data network, the VPN gateway being configured to pass communication session signaling traffic between an entity in one of said plurality of VPNs and the call server for establishing a communication session between said entity in one of said plurality of VPNs and an entity in an external Time Division Multiplex 'TDM' network, said external TDM network handling communication session bearer traffic in a TDM format different to a packet data format of the first data network; the VPN converter comprising:

interfaces for interfacing the first and second data networks and directly interfacing the first data network to said external TDM network, means for receiving bearer traffic relating to said communication session established between said entity in one of said plurality of VPNs and the entity in the external TDM network; and means for converting said bearer traffic between the packet data format of the first data network and the TDM format used in the external TDM network.

32. The VPN converter of claim 31, wherein the VPN converter comprises a plurality of virtual routers, said plurality of virtual routers being provided for said plurality of VPNs such that each of said plurality of virtual routers is provided with an address from an address space of its respective one of the plurality of VPNs.

33. The VPN converter of claim 31, wherein the VPN converter is arranged to convert an encoding format of the bearer traffic.

34. The VPN converter of claim 33, wherein the encoding format comprises one of G.711, G.729, and G.726 formats.

35. The VPN converter of claim 31, wherein the VPN converter is arranged to determine which of the plurality of the VPNs the communication session signaling information relates to, and to associate VPN converter resources to a communication session associated with the identified VPN.

36. The VPN converter of claim 35, wherein the VPN converter is arranged to determine the VPN identity based on an external network address associated with the VPN entity.

37. The VPN converter of claim 35, wherein the VPN converter is arranged to determine the VPN identity based on a VPN identifier parameter provided by an entity of the VPN.

38. The VPN converter of claim 35, wherein the VPN converter is arranged to determine the VPN identity based on parameters associated with establishment of the communication session.

39. The VPN converter of claim 32, wherein the VPN converter comprises a network address translation 'NAT' function and the NAT function is configured to provide a network address translation function to each of the virtual routers.

40. A computer readable medium storing computer readable instructions which, when executed by a processor of a computing device, cause said computing device to implement, in a communication system comprising: a plurality of virtual private networks 'VPNs' interconnected by a first data network; a second data network connected to the plurality of VPNs via the first data network, the second data network using a network addressing scheme that is different to a network addressing scheme used by at least one of said plurality of VPNs; a VPN gateway interfacing the first data network and a call server in the second data network; and a VPN converter interfacing the first and second data networks and directly interfacing the first data network to an external Time Division Multiplex 'TDM' network; the steps of:

causing the VPN gateway to pass communication session signaling traffic between an entity in one of said plurality of VPNs and the call server for establishing a communication session between said entity in one of said plurality of VPNs and an entity in said external TDM network, said external TDM network handling communication session bearer traffic in a TDM format different to a packet data format of the first data network; and
causing the VPN converter to receive bearer traffic relating to said communication session established between said entity in one of said plurality of VPNs and the entity in the external TDM network and to convert said bearer traffic between the packet data format of the first data network and the TDM format used in the external TDM network.

* * * * *

UNITED STATES PATENT AND TRADEMARK OFFICE
CERTIFICATE OF CORRECTION

PATENT NO. : 7,593,388 B1 Page 1 of 1
APPLICATION NO. : 10/675162
DATED : September 22, 2009
INVENTOR(S) : Mitchell et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1257 days.

Signed and Sealed this

Twenty-first Day of September, 2010

David J. Kappos
*Director of the United States Patent and Trademark Office*